United States Patent
Nishio et al.

(10) Patent No.: US 12,219,614 B2
(45) Date of Patent: Feb. 4, 2025

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 220 days.

(21) Appl. No.: 17/593,671

(22) PCT Filed: Mar. 24, 2020

(86) PCT No.: PCT/JP2020/013064
§ 371 (c)(1),
(2) Date: Sep. 22, 2021

(87) PCT Pub. No.: WO2020/196537
PCT Pub. Date: Oct. 1, 2020

(65) Prior Publication Data
US 2022/0191947 A1 Jun. 16, 2022

(30) Foreign Application Priority Data
Mar. 28, 2019 (JP) ................. 2019-064605

(51) Int. Cl.
*H04W 74/08* (2024.01)
*H04J 13/00* (2011.01)
(Continued)

(52) U.S. Cl.
CPC ..... *H04W 74/0841* (2013.01); *H04J 13/0062* (2013.01); *H04W 72/0466* (2013.01); *H04W 74/0866* (2013.01)

(58) Field of Classification Search
None
See application file for complete search history.

(56) References Cited

U.S. PATENT DOCUMENTS

2007/0230600 A1* 10/2007 Bertrand ........... H04W 74/0833
  375/260
2010/0296436 A1 11/2010 Kwon et al.
(Continued)

OTHER PUBLICATIONS

Huawei, HiSilicon, "RACH preamble design for NR", Feb. 13-17, 2017, 3GPP TSG RAN WG1 Meeting #88, R1-1701709, pp. 1-16 (Year: 2017).*

(Continued)

*Primary Examiner* — Steve R Young
(74) *Attorney, Agent, or Firm* — Seed IP Law Group LLP

(57) ABSTRACT

The present invention provides a transmission device, a reception device, a transmission method, and a reception method that implement an appropriate random access procedure in accordance with a propagation delay between a terminal and a base station. A terminal (100) is provided with a wireless transmission unit (103) which transmits a random access channel signal, and a control unit (107) which sets, from among a plurality of preamble sequence candidates, a preamble sequence for use in the random access channel signal. At least one of the plurality of preamble sequence candidates is composed of two or more mutually different code sequences.

18 Claims, 11 Drawing Sheets

(51) Int. Cl.
*H04W 72/04* (2023.01)
*H04W 72/044* (2023.01)
*H04W 74/0833* (2024.01)

(56) References Cited

U.S. PATENT DOCUMENTS

| | | | | |
|---|---|---|---|---|
| 2015/0124716 | A1* | 5/2015 | Li | H04L 27/2666 370/329 |
| 2016/0119887 | A1* | 4/2016 | Charipadi | H04J 13/0062 370/335 |
| 2017/0332409 | A1* | 11/2017 | Yerramalli | H04L 1/08 |
| 2018/0317241 | A1* | 11/2018 | Xia | H04W 72/12 |
| 2020/0266908 | A1* | 8/2020 | Qian | H04L 5/0094 |

OTHER PUBLICATIONS

Huawei, HiSilicon, "RACH preamble design for NR", Feb. 13-17, 3GPP TSG RAN WG1 Meeting #88, R1-1701709, pp. 1-16 (Year: 2017).*
Nokia, Alcatel-Lucent Shanghai Bell, "NR Physical Random Access Channel", Jan. 16-20, 2017, 3GPP TSG-RAN WG1 AH_NR Meeting (R1-1700650), pp. 1-14 (Year: 2017).*
Nokia (Year: 2017).*
Huawei, HiSilicon, "RACH preamble design for NR," R1-1701709, Agenda Item: 1 8.1.1.4.1, 3GPP TSG RAN WG1 Meeting #88, Athens, Greece, Feb. 13-17, 2017. (16 pages).
Indian Office Action, dated Mar. 15, 2023, for Indian Patent Application No. 202127043032. (6 pages).
3GPP TR 38.811 V15.0.0, "3rd Generation Partnership Project; Technical Specification Group Radio Access Network; Study on New Radio (NR) to support non-terrestrial networks (Release 15)," Jun. 2018, 118 pages.
3GPP TS 38.321 V15.4.0, "3rd Generation Partnership Project; Technical Specification Group Radio Access Network; NR; Medium Access Control (MAC) protocol specification (Release 15)," Dec. 2018, 77 pages.
International Search Report, dated Jun. 9, 2020, for International Application No. PCT/JP2020/013064, 3 pages. (with English translation).
NTT DoCoMo, "Random Access Channel Structure for E-UTRA Uplink," R1-060786, Agenda Item: 10.2.3, 3GPP TSG-RAN WG1 Meeting #44bis, Athens, Greece, Mar. 27-31, 2006, 9 pages.
Panasonic, "Random access design for E-UTRA uplink," R1-061114, Agenda Item: 11.1.2, TSG-RAN WG1 Meeting#45, Shanghai, China, May 8-12, 2006, 6 pages.
InterDigital Inc., "On PRACH Preamble Format for Capacity Enhancement and Beam Management," R1-1718476, Agenda Item: 7.1.4.1, 3GPP TSG RAN WG1 Meeting 90bis, Prague, Czech Republic, Oct. 9-13, 2017, 8 pages.
English Translation of Chinese Search Report dated Dec. 28, 2023, for the corresponding Chinese Patent Application No. 202080023943. X, 4 pages.
Nokia, Alcatel-Lucent Shanghai Bell, "NR Physical Random Access Channel," R1-1700650, Agenda item: 5.1.1.4.1, 3GPP TSG-RAN WG1 AH_NR Meeting, Spokane, U.S.A., Jan. 16-20, 2017. (14 pages).

* cited by examiner

TRANSMISSION DEVICE, RECEPTION DEVICE, TRANSMISSION METHOD, AND RECEPTION METHOD

TECHNICAL FIELD

The present disclosure relates to a transmission apparatus, a reception apparatus, a transmission method, and a reception method.

BACKGROUND ART

In the standardization of 5G, New Radio access technology (NR) was discussed in 3GPP and the Release 15 (Rel. 15) specification for NR was published.

In radio communication systems such as NR, a random access procedure using a random access channel is performed for connection between a terminal (also called a User Equipment (UE)) and a base station (also called a gNodeB (gNB)).

CITATION LIST

Non-Patent Literature

NPL 1
3GPP, TR38.811, "Study on New Radio (NR) to support non terrestrial networks"
NPL 2
3GPP TS38.321, "Medium Access Control (MAC) protocol specification"

SUMMARY OF INVENTION

However, there is scope for further study on an appropriate random access procedure depending on a propagation delay of propagation between a terminal and a base station.

One non-limiting and exemplary embodiment of the present disclosure facilitates providing a transmission apparatus, a reception apparatus, a transmission method, and a reception method capable of realizing the appropriate random access procedure corresponding to a propagation delay of propagation between the terminal and the base station.

A transmission apparatus according to an exemplary embodiment of the present disclosure includes: transmission circuitry, which, in operation, transmits a signal of a random access channel; and control circuitry, which, in operation, configures a preamble sequence from among a plurality of preamble sequence candidates, the preamble sequence being used for the signal, in which at least one of the plurality of preamble sequence candidates is composed of two or more code sequences different from each other.

A reception apparatus according to an embodiment of the present disclosure includes: reception circuitry, which, in operation, receives a signal of a random access channel; and control circuitry, which, in operation, determines a preamble sequence from among a plurality of preamble sequence candidates, the preamble sequence being included in the signal, in which at least one of the plurality of preamble sequence candidates is composed of two or more code sequences different from each other.

A transmission method according to an exemplary embodiment of the present disclosure includes: configuring, from among a plurality of preamble sequence candidates, a preamble sequence used for a signal of a random access channel; and transmitting the signal of the random access channel, in which at least one of the plurality of preamble sequence candidates is composed of two or more code sequences different from each other.

A reception method according to an exemplary embodiment of the present disclosure includes: receiving a signal of a random access channel; and determining, from among a plurality of preamble sequence candidates, a preamble sequence included in the signal, in which at least one of the plurality of preamble sequence candidates is composed of two or more code sequences different from each other.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to realize an appropriate random access procedure corresponding to a propagation delay of propagation between a terminal and a base station.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

[Random Access Procedure]

For example, a random access procedure is performed by 4-step random access (also referred to as "4-step Random Access Channel (RACH) or "4-Step Contention Based Random dom Access (CBRA)).

Figure 1:
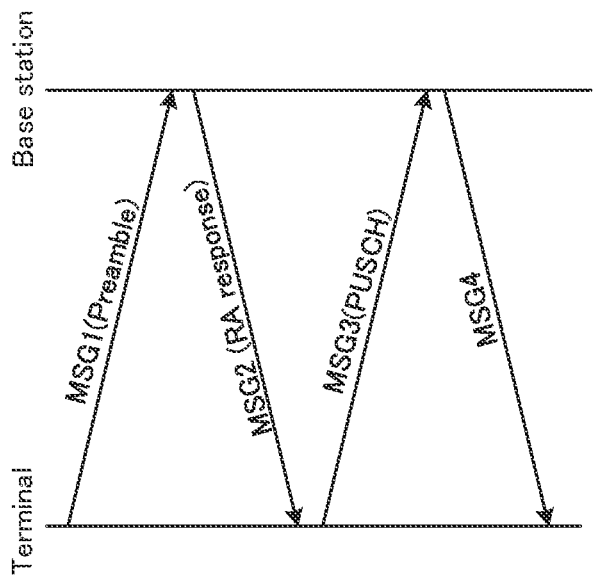
FIG. 1 illustrates an example of a 4-step random access procedure.

FIG. 1 illustrates an example of the 4-step random access procedure. In the 4-step random access, for example, as illustrated in FIG. 1, a terminal (UE) transmits a Preamble signal of a Physical Random Access Channel (PRACH) to a base station (gNB) in transmission (MSG1) at the first step. The MSG1 transmission by the terminal is performed at a transmission timing (slot timing) notified per cell by the base station.

The base station receives and decodes MSG1, and, in transmission (MSG2) at the second step, notifies the terminal of a response (RA response) to the Preamble signal, scheduling information including an uplink transmission timing of MSG3, and the like.

The terminal receives and decodes MSG2, and, in transmission (MSG3) at the third step, notifies the base station of information for Connection establishment such as information on the terminal (e.g., terminal ID or the like) using the scheduling information indicated by MSG2. MSG3 is notified, for example, in a Physical Uplink Shared Channel (PUSCH). The information notified by MSG3 may be referred to as Radio Resource Control (RRC) connection request information.

The base station receives and decodes MSG3 and notifies a Connection establishment response or the like in transmission (MSG4) at the fourth step.

[PRACH]

For example, the PRACH (e.g., MSG1 in FIG. 1) used in NR is composed of a cyclic prefix (CP), Preamble sequence (Preamble part), and guard period (GP). The Preamble sequence is generated, for example, from code sequences (e.g., Cyclic shifted Zadoff-Chu (CS-ZC) sequences) or the like having preferable correlation characteristics. The CP is a signal obtained by copying a part of the Preamble sequence. The GP is a no-transmission section. Note that, the code sequences used for the Preamble sequence are not limited to the CS-ZC sequences, and may be any code sequences having preferable correlation characteristics. Note that a signal including the CP, Preamble sequence, and GP, and transmitted in the PRACH may be referred to as "Preamble signal." The transmission of the Preamble signal and the like in the PRACH may be described as "PRACH transmission."

These pieces of information on the PRACH are included in cell information of the base station, for example, and notified to the terminal. For example, CS-ZC sequences different between Preamble numbers are uniquely associated with the Preamble numbers. The terminal configures, for the Preamble sequence, a CS-ZC sequence corresponding to a Preamble number selected at random. For example, even when a plurality of terminals transmit PRACHs using the same time resources and frequency resources, the base station is capable of detecting a plurality of Preamble numbers (in other words, Preamble signals of a plurality of terminals) simultaneously by detection of correlations between the CS-ZC sequences when the plurality of terminals select respective different Preamble numbers.

[Extension to Non-Terrestrial Network (NTN)]

In NR, extension to Non-Terrestrial Networks (NTNs) such as communications using a satellite and/or a high-altitude pseudolite (High-altitude platform station (HAPS)) is considered (e.g., see Non-Patent Literature (hereinafter referred to as "NPL") 1).

In an NTN environment, a satellite's coverage area (e.g., one or more cells) for a terrestrial terminal or a terminal on an aircraft is formed by beams from the satellite. In addition, the round-trip time of radio wave propagation between the terminal and the satellite is determined by the altitude of the satellite (e.g., up to about 36,000 km) and/or the angle viewed from the terminal.

For example, the satellite forms a cell with a diameter of several 100 km. The cell formed by the satellite is larger than a cell with a diameter of several km formed by a terrestrial base station or the like. Accordingly, the difference in the propagation delay of propagation between the terminal and the satellite is larger depending on the position of the terminal existing in the cell formed by the satellite.

For example, NPL 1 describes that in an NTN, the Round Trip Time (RTT) of radio wave propagation between a satellite and a terminal is about 544 ms. In addition, NPL 1 describes that a maximum delay difference of about 1.6 ms is caused depending on the location of the terminal within beams (within a cell). The maximum delay difference indicates, for example, a difference between, on one hand, the round-trip time between a terminal at the farthest location from the satellite and the satellite and, on the other hand, the round-trip time between a terminal at the nearest location from the satellite and the satellite within the beams (within the cell).

In a terrestrial cell with a diameter of several km, the maximum delay difference is less than 0.1 ms, for example. Thus, the maximum delay difference in the NTN is much greater than in the terrestrial cell. Therefore, in the NTN, the delay difference of Preamble signals received by the satellite from terminals is large.

In a cellular system, inter-cell interference can be reduced by using a different set of ZC sequences for each cell. In LTE targeting a terrestrial cellular system or NR, CS multiplexing is used in a cell. Thus, CS-ZC sequences corresponding in number to the product of the number of ZC sequences used per cell and the number of multiplexable CSs are used in the cell. In this case, the probability (collision probability) that a collision between Preamble signals of terminals occurs because of selection of the same CS-ZC sequence by the terminals in the cell is reduced.

On the other hand, in an NTN environment, the size of a cell is extremely larger than that of a terrestrial cell that is several kilometers long, resulting in a larger delay difference between Preamble signals. Thus, it may be impossible to secure a sufficient number of multiplexable CSs. Therefore, in the NTN environment, in order to achieve a sufficiently low collision probability in a cell, it is conceivable to increase the number of ZC sequences used per cell to compensate for a small number of multiplexable CSs. However, for example, the number of usable ZC sequences is limited (for example, a maximum of 838 ZC sequences are usable in the case of the ZC sequence with a sequence length of 839). Accordingly, when the number of ZC sequences used per cell is large, the number of cells to which different ZC sequences are assigned (reuse factor) is small, and interference with other cells increases correspondingly. For example, in the NTN environment, a cell is formed by a beam formed by a single satellite. Accordingly, a signal power difference between one cell and another is determined not by distance attenuation of radio waves but by the directivity characteristics of the satellite beam. Therefore, interference with other cells is remarkable as compared to the terrestrial cellular system.

In view of the above, the present disclosure achieves an appropriate random access procedure depending on the propagation delay between a terminal and a base station by flexibly configuring the configuration of a Preamble sequence, for example, even in the NTN environment where the propagation delay of propagation between terminals and the base station greatly differ between the terminals.

One Embodiment

[Overview of Communication System]

A communication system according to each embodiment of the present disclosure includes terminal 100 and base station 200. In the following description, by way of example, terminal 100 (corresponding to the transmission apparatus) transmits a PRACH, and base station 200 (corresponding to the reception apparatus) receives the PRACH.

Figure 2:
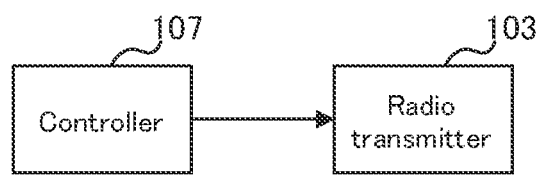
FIG. 2 is a block diagram illustrating a configuration of a part of a terminal according to an embodiment.

FIG. 2 is a block diagram illustrating a configuration of a part of terminal 100 according to an embodiment of the present disclosure. In terminal 100 illustrated in FIG. 2, radio transmitter 103 transmits a signal of a random access channel. Controller 107 configures, from among a plurality of Preamble sequence candidates, a preamble sequence used for the signal of the random access channel. At least one of the plurality of preamble sequence candidates is composed of two or more code sequences different from each other.

Figure 3:
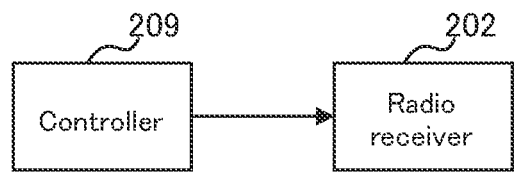
FIG. 3 is a block diagram illustrating a configuration of a part of a base station according to an embodiment.

FIG. 3 is a block diagram illustrating a configuration of a part of base station 200 according to an embodiment of the present disclosure. In base station 200 illustrated in FIG. 3, radio receiver 202 receives the signal of the random access channel. Controller 209 determines, from among a plurality of preamble sequence candidates, a preamble sequence included in the signal of the random access channel. At least one of the plurality of preamble sequence candidates is composed of two or more code sequences different from each other.

[Configuration of Terminal]

Figure 4:
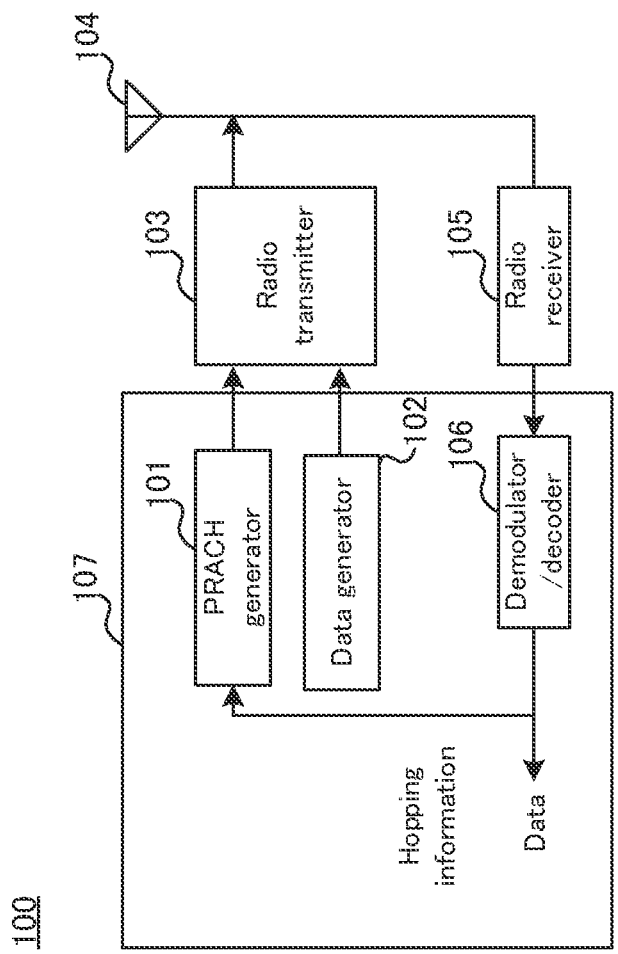
FIG. 4 is a block diagram illustrating a configuration example of the terminal according to an embodiment.

FIG. 4 is a block diagram illustrating an example of the configuration of terminal 100 according to Embodiment 1. Terminal 100 includes PRACH generator 101, data generator 102, radio transmitter 103, antenna 104, radio receiver 105, and demodulator/decoder 106. PRACH generator 101, data generator 102, and demodulator/decoder 106 may be included in controller 107.

PRACH generator 101 determines PRACH transmission resources from among candidates for PRACH transmission resources available within the cell of base station 200, for example. For example, PRACH generator 101 configures a time-frequency resource and a Preamble number to be used for PRACH transmission based on information on time-frequency resources and a Preamble number group available for the PRACH transmission. The information on the time-frequency resources and Preamble number group available for the PRACH transmission, for example, is notified by base station 200.

Note that the information on PRACH transmission resource candidates available to terminal 100 (PRACH transmission resource information) includes configuration information on the PRACH such as candidates for the sequence number for a Preamble (Preamble number group). CS amount. PRACH time resources (e.g., periodicity), PRACH frequency resource positions. Preamble format numbers, and the like. Further, the PRACH transmission resource information available to terminal 100 may include hopping information. The hopping information is information indicating a hopping pattern for a sequence number for a Preamble. In other words, the PRACH transmission resource information includes information used for generation of the Preamble signal of the PRACH and information on the time-frequency resource used for transmission of the Preamble signal of the PRACH. Further, the PRACH transmission resource information is included in control information (such as an RRC message (e.g., RACH-ConfigCommon, RACH-ConfigDedicated, and RACH-ConfigGeneric)) transmitted by connected base station 200 (e.g., a serving cell) and is notified to terminal 100 in the system information. Note that part of the control information may be system common information defined by the specifications, and does not have to be notified by base station 200 to terminal 100.

For example, PRACH generator 101 configures one Preamble number from the Preamble number group. PRACH generator 101 configures a Preamble sequence based on a ZC sequence corresponding to the configured Preamble number and the hopping information. Then, PRACH generator 101 generates the signal of the PRACH (e.g., a Preamble signal) to be transmitted in the configured time-frequency resources.

Note that, examples of the Preamble sequence generated based on the ZC sequence and the hopping information will be described later.

Note that PRACH generator 101 may perform cyclic shifting on the generated Preamble sequence by using a CS amount.

Data generator 102 generates an uplink transmission data sequence, and generates a data signal to be transmitted by time-frequency resources for data signal transmission allocated by base station 200 and a Modulation and Coding Scheme (MCS).

Radio transmitter 103 performs transmission processing such as D/A conversion and/or up-conversion on the signal outputted from PRACH generator 101 and the data signal outputted from data generator 102, and transmits the radio signal obtained by the transmission processing from antenna 104 to base station 200.

Radio receiver 105 performs reception processing such as down-conversion and/or A/D conversion on a reception signal received from base station 200 via antenna 104, and outputs the signal subjected to the reception processing to demodulator/decoder 106.

Demodulator/decoder 106 performs demodulation and decoding processing on the signal outputted from radio receiver 105. For example, demodulator/decoder 106 demodulates and decodes a response data signal of the PRACH. For example, demodulator/decoder 106 outputs the hopping information to PRACH generator 101 when the demodulated and decoded information includes the hopping information.

[Configuration of Base Station]

Figure 5:
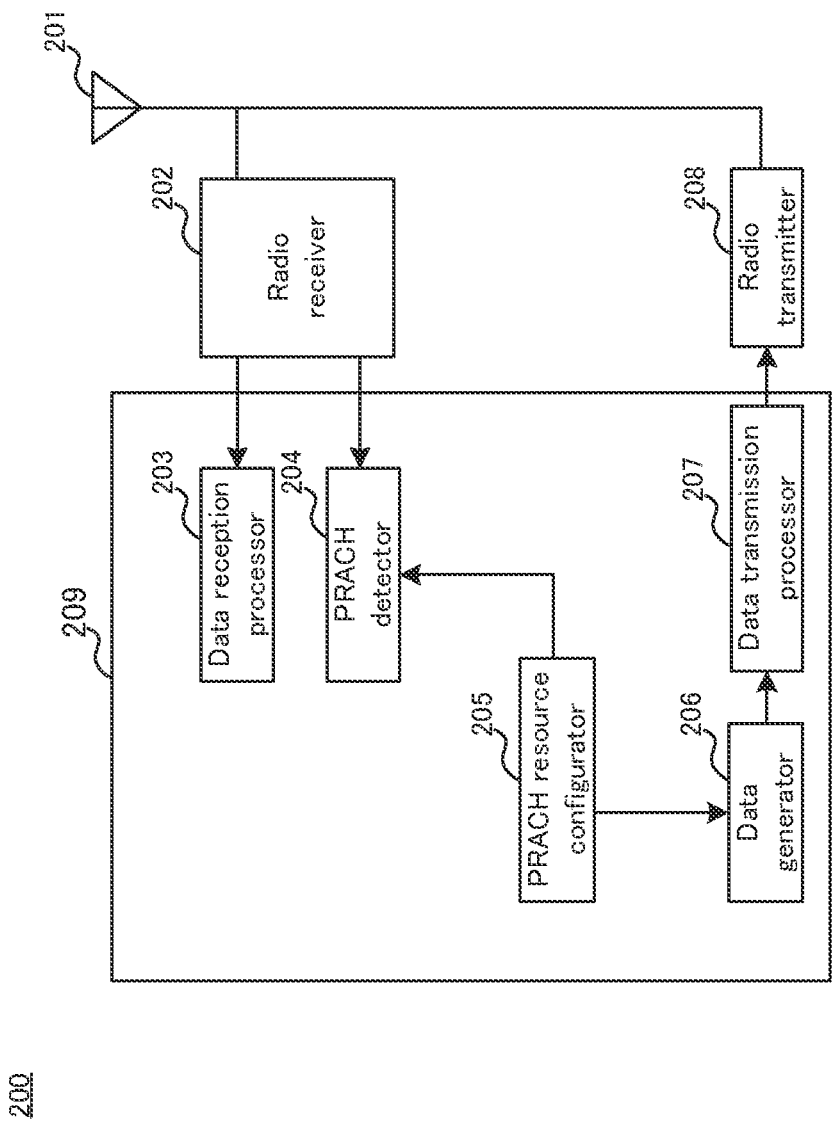
FIG. 5 is a block diagram illustrating a configuration example of the base station according to an embodiment.

FIG. 5 is a block diagram illustrating an example of the configuration of base station 200 according to the present embodiment. Base station 200 includes antenna 201, radio receiver 202, data reception processor 203, PRACH detector 204, PRACH resource configurator 205, data generator 206, data transmission processor 207, and radio transmitter 208. Data reception processor 203, PRACH detector 204, PRACH resource configurator 205, data generator 206, and data transmission processor 207 may be included in controller 209.

Radio receiver 202 performs reception processing such as down-conversion and/or A/D conversion on the data signal and PRACH signal received via antenna 201 from terminal 100, and outputs the signal subjected to the reception processing to data reception processor 203 and PRACH detector 204.

PRACH resource configurator 205 configures, for PRACH detector 204, the time-frequency resources and Preamble numbers available for PRACH transmission within the cell. In addition, PRACH resource configurator 205 outputs, to data generator 206, system information (e.g., Random Access Configuration information, RACH-Config information, and the like) including the time-frequency resources and Preamble numbers available for PRACH transmission within the cell. Here, the time-frequency resources available for PRACH transmission may be referred to as "RACH Occasion."

The information configured by PRACH resource configurator 205 for PRACH detector 204 may include hopping information. In addition, the system information outputted by PRACH resource configurator 205 to data generator 206 may include the hopping information. Note that, the hopping information may be configured for each cell.

PRACH detector 204 detects the Preamble signal of the PRACH and estimates the transmission timing and the reception timing by performing, on the Preamble signal of the PRACH received, correlation processing between the Preamble signal and a replicated signal of the Preamble signal generated using a ZC sequence corresponding to the Preamble number configured by PRACH resource configurator 205 and the hopping information.

Note that the correlation processing performed by PRACH detector 204 may be a process performed in the time domain for calculating a delay profile, or a process of calculating the delay profile by performing IFFT after performing the correlation processing (division processing) in the frequency domain. The calculated delay profile may be used to estimate the transmission timing and/or reception timing.

Data reception processor 203 performs the demodulation and decoding processing on the received data signal. Further, data reception processor 203 may also perform channel estimation and timing estimation based on the received data signal.

Data generator 206 generates a downlink data signal including user data, system information, specific control information, and the like. Data generator 206 outputs the generated downlink data signal to data transmission processor 207.

Data transmission processor 207 encodes and modulates the downlink data signal outputted from data generator 206, and outputs the modulated signal to radio transmitter 208.

Radio transmitter 208 performs transmission processing such as D/A conversion, up-conversion, and amplification on the signal outputted from data transmission processor 207, and transmits, via antenna 201, the radio signal obtained by the transmission processing.

Next, the Preamble sequence in the present embodiment will be described. Note that, hereinafter, an example of Preamble sequences having four ZC sequences will be described. A Preamble sequence having four ZC sequences may be regarded as a Preamble sequence in which four ZC sequences are concatenated with one another (or a Preamble sequence for which the number of concatenated sequences is four). Further, in the following. Preamble sequences, the number of which usable per cell is 64, and which are usable in each of two cells used (in other words, candidates for the Preamble sequences) will be described.

First Example of Preamble Sequence

Figure 6:
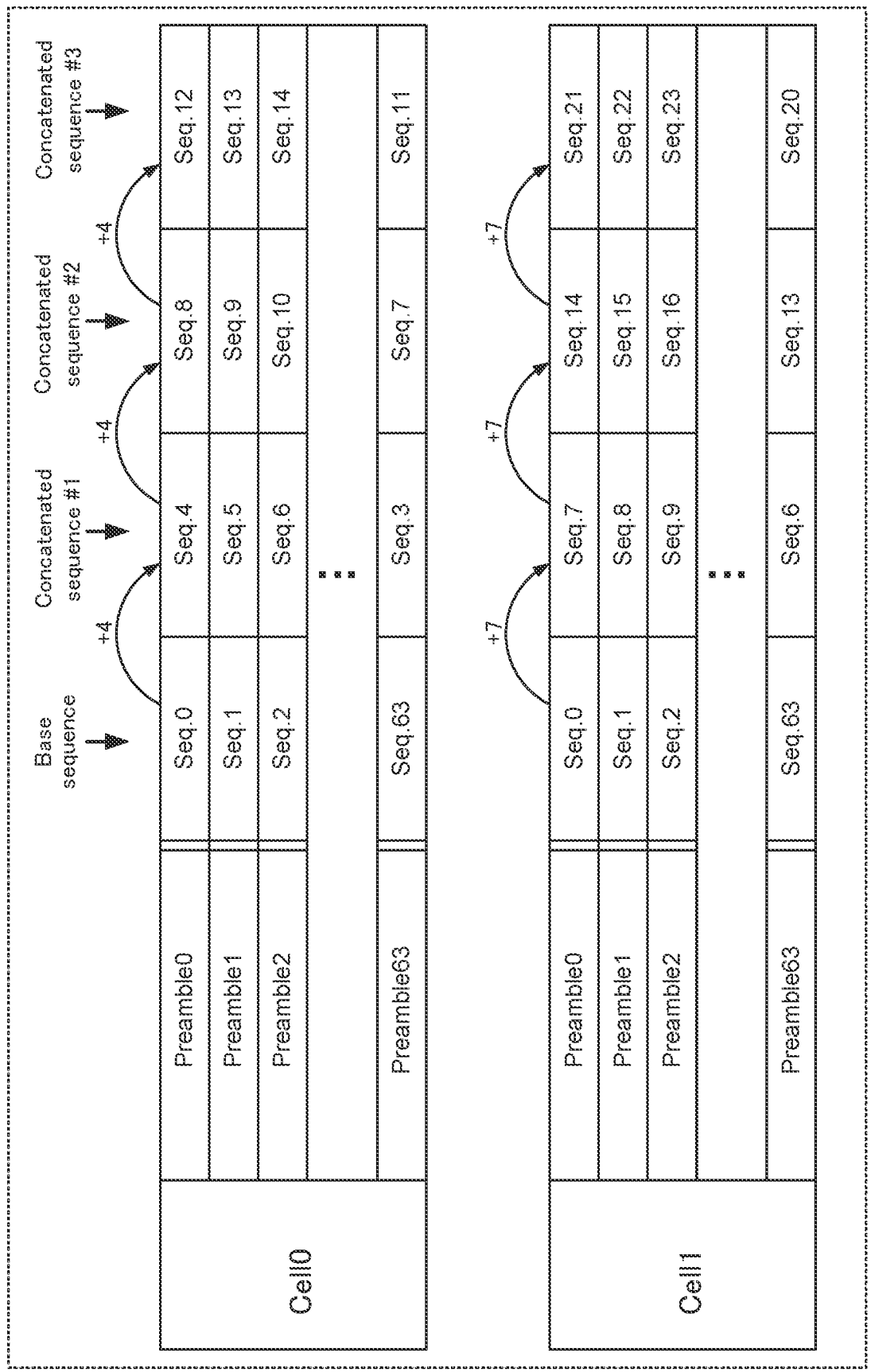
FIG. 6 illustrates a first example of Preamble sequences in an embodiment.

FIG. 6 illustrates a first example of Preamble sequences in the present embodiment. FIG. 6 illustrates Preamble sequences usable in each of two cells (Cell0 and Cell1). Further, the Preamble sequences usable per cell are 64 Preamble sequences of Preamble0 to Preamble63. Each of Preamble0 to Preamble63 has an identification number of from 0 to 63 for identifying the Preamble sequence (Preamble number). Further, Seq.i illustrated in FIG. 6 represents one ZC sequence, and i indicates the sequence number of the ZC sequence. In the example of FIG. 6, i takes any value of integers of from 0 to 63. Note that, the identification number (cell ID (Identification)) of Cell0 is 0, and the cell ID of Cell1 is 1.

In FIG. 6, the ZC sequences illustrated in the left column may be described as "base sequences" (or "root sequences"). In addition, the ZC sequences concatenated with each of the base sequences may be described as "concatenated sequence #1," "concatenated sequence #2," and "concatenated sequence #3," respectively, in the order concatenated.

In the example of FIG. 6, a set of base sequences common between the cells is configured, and an offset different for each cell is configured. For example, in FIG. 6, the set of 64 ZC sequences of Seq.0 to Seq.63 is a set of base sequences common between Cell0 and Cell1. In FIG. 6, the offset for Cell0 is 4, and the offset for Cell1 is 7.

As illustrated in FIG. 6, in the first example, usable Preamble sequences (candidates for Preamble sequences) include Preamble sequences having code sequences differing from one another.

For example, in FIG. 6, the base sequence for Preamble0 in Cell0 is Seq.0. For Seq.0 of the base sequence, Seq.4 having the sequence number of 4 obtained by adding 4, which is the offset for Cell0, to the sequence number of Seq.0 is configured as concatenated sequence #1. Seq.8 having the sequence number of 8 obtained by adding 4 to the sequence number of 4 of Seq.4 is configured as concatenated sequence #2. Seq.12 having the sequence number of 12 obtained by adding 4 to the sequence number of 8 of Seq.8 is configured as concatenated sequence #3. Like Preamble0 in Cell0, concatenated sequences #1 to #3 are also configured for each of Preamble1 to Preamble63 in Cell0 based on the base sequence and the offset.

For example, in FIG. 6, the base sequence for Preamble0 in Cell1 is Seq.0 as in Preamble0 in Cell0. Seq.7, Seq.14, and Seq.21 are configured as concatenated sequence #1, concatenated sequence #2, and concatenated sequence #3, respectively, by adding 7, which is the offset for Cell1, to the sequence number of Seq.0, and then to one resulting sequence number after another. Like Preamble0 in Cell1, concatenated sequences #1 to #3 are also configured for each of Preamble1 to Preamble63 in Cell1 based on the base sequence and the offset.

Note that a Mod operation may be used for the operation in offset addition. For example, in the example of FIG. 6, the sequence numbers not exceeding the number of usable ZC sequences are calculated by using a Mod 64 operation according to the number of 64 of usable Preamble sequences (usable ZC sequences). For example, with respect to the base sequence of Seq.63 in Preamble63 of FIG. 6, four that is the offset for Cell0 is added to the sequence number of Seq.63. Thus, Seq.3 having the sequence number of 3 (e.g., (63+4)Mod 64=3) calculated using the Mod 64 operation is configured as concatenated sequence #1.

In the example illustrated in FIG. 6, the set of base sequences common between Cell0 and Cell1 are configured, and the offsets different between Cell0 and Cell1 are configured. This configuration makes it possible for the base station receiving a Preamble signal to identify a Preamble sequence within a cell or across cells. This configuration also makes it possible to increase the reuse factor of the sequence numbers of the ZC sequences. In addition, a Preamble signal including a Preamble sequence in which a plurality of ZC sequences are concatenated can be combined and received by the base station. Thus, for example, long-range radio communication in an NTN environment (e.g., a satellite communication environment) is possible.

Note that, the example of FIG. 6 is illustrated in which the offset different between the cells is 4 or 7, but the offset is not limited to 4 or 7 as long as the offset is different between the cells. For example, the offset may be equal to or greater than 1. Further, the offset may be equal to or greater than the number of ZC sequences included in the Preamble sequence (4 in the case of FIG. 6).

Further, the offset in the first example may correspond to an example of a hopping pattern indicated by hopping information. For example, the hopping pattern may be a pattern that serially defines an offset for configuring concatenated sequence #1 from the base sequence, an offset for configuring concatenated sequence #2 from concatenated sequence #1, and an offset for configuring concatenated sequence #3 from concatenated sequence #2. For example, the hopping pattern in Cell0 in FIG. 6 may be understood as {4, 4, 4} and the hopping pattern in Cell1 in FIG. 6 as {7, 7, 7}. Further, the hopping information may indicate one offset or a hopping pattern including a plurality of offsets.

For example, PRACH generator 101 of terminal 100 existing in Cell0 configures one Preamble number from the Preamble number group (0 to 63 in FIG. 6). PRACH generator 101 generates a Preamble sequence based on a ZC sequence corresponding to the configured Preamble number and hopping information (an offset of 4 in FIG. 6). Here, the ZC sequence corresponding to the Preamble number configured by PRACH generator 101 corresponds to a base sequence. For example, PRACH generator 101 configures concatenated sequences based on the base sequence and the hopping information, and concatenates the base sequence and the concatenated sequences together to generate the Preamble sequence.

For example, also in PRACH detector 204 of base station 200 as in PRACH generator 101, the concatenated sequences are configured based on the base sequence and the hopping information, and the base sequence and the concatenated sequences are concatenated together to generate a Preamble sequence. PRACH detector 204 generates the Preamble sequence usable in the cell and generates a replicated signal of the Preamble signal including the Preamble sequence.

Second Example of Preamble Sequence

Figure 7:
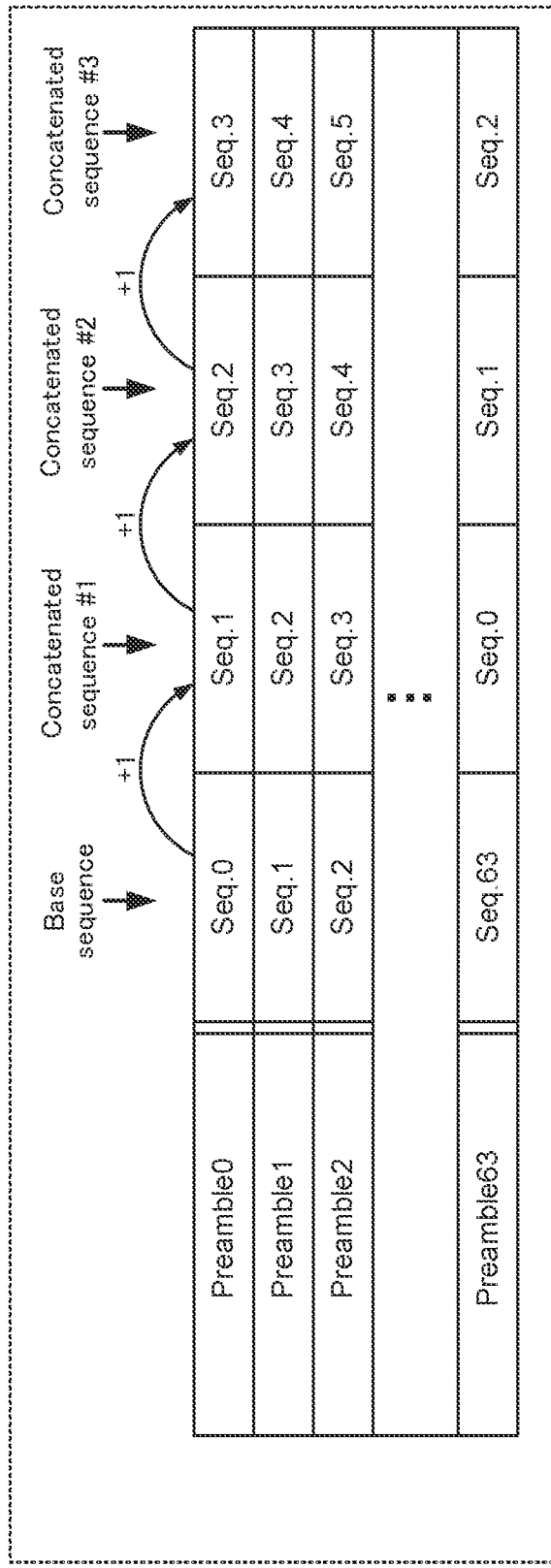
FIG. 7 illustrates a reference example of the Preamble sequences.

FIG. 7 illustrates a reference example of Preamble sequences. FIG. 7 illustrates 64 Preamble sequences (Preamble0 to Preamble63) for which the offset is configured to 1 unlike in the first example.

In FIG. 7, for example, when Preamble1 is shifted rightward in FIG. 7 by one ZC sequence, Seq.1, Seq.2, and Seq.3 of shifted Preamble1 partially overlap with Seq.1, Seq.2, and Seq.3 of Preamble0. The shift to the right in FIG. 7 (or to the left) corresponds, for example, to a shift (e.g., a delay) in the time domain in a Preamble signal including a Preamble sequence. Therefore, for example, when the Preamble signal including Preamble1 is shifted in the time domain by one ZC sequence, it is difficult for the base station receiving the Preamble signal to distinguish between Preamble1 and Preamble2.

In the second example, an example of Preamble sequences will be described in which even when one Preamble sequence is shifted in the time domain, the ZC sequences included in the one Preamble sequence do not overlap with (are not continuously the same as) ZC sequences of another Preamble sequence.

Figure 8:
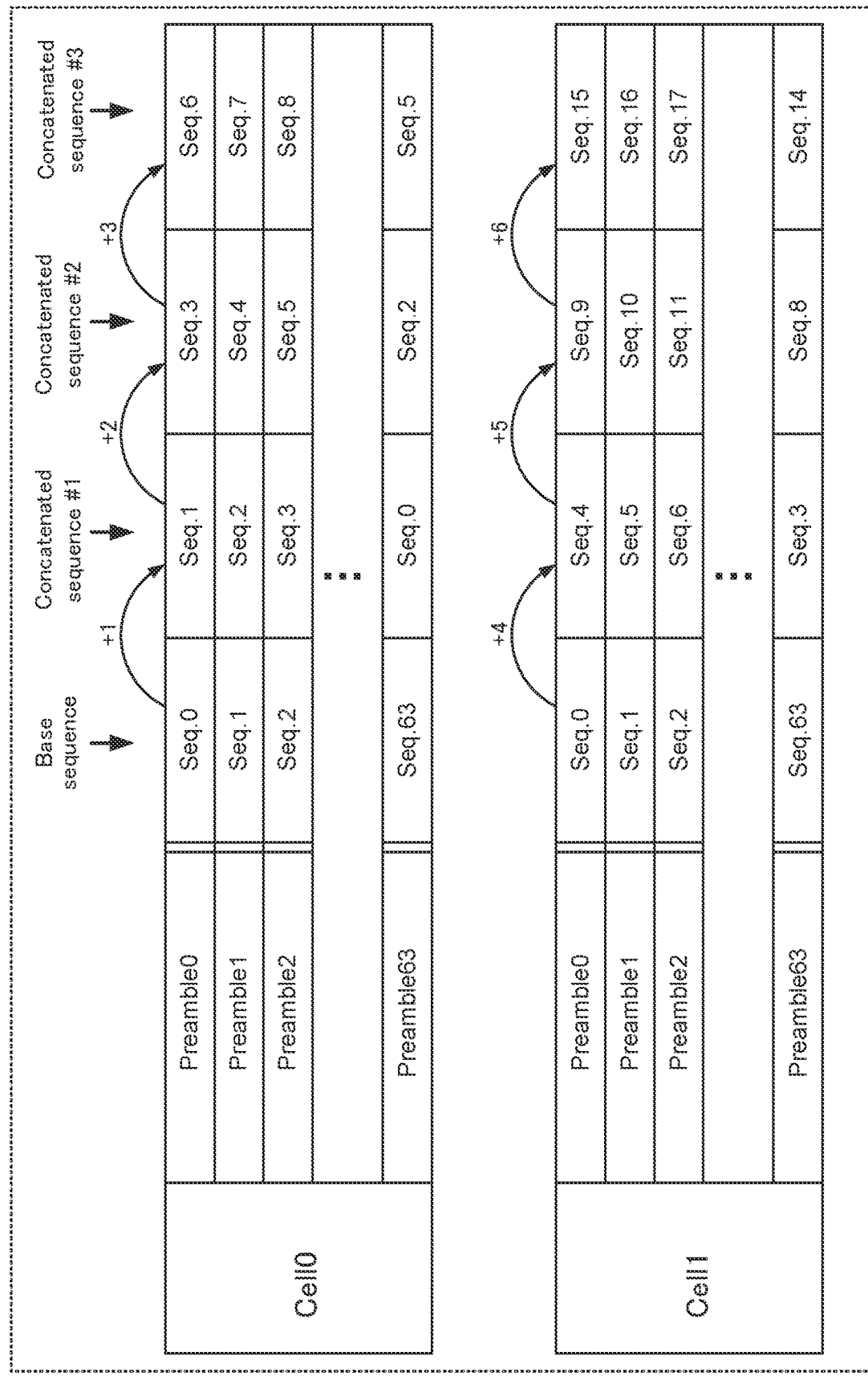
FIG. 8 illustrates a second example of the Preamble sequences in an embodiment.

FIG. 8 illustrates the second example of Preamble sequences in the present embodiment. FIG. 8 like FIG. 6 illustrates Preamble sequences usable in each of two cells (Cell0 and Cell1).

In the example of FIG. 8, a set of base sequences common between the cells is configured, and an offset different for each cell is configured. In addition, offsets are configured to different values between adjacent ZC sequences. The offset for configuring concatenated sequence #1 from the base sequence may be described as "first offset," the offset for configuring concatenated sequence #2 from concatenated sequence #1 may be described as "second offset," and the offset for configuring concatenated sequence #3 from concatenated sequence #2 may be described as "third offset."

The offsets in the second example may be configured based on the identification number of the cell and the order of the offsets. When the identification number of the cell is k, jth offset $N_1$ may be configured to $N_1=\{k\times(J-1)\}+j$. Here, J is the number of ZC sequences included in the Preamble sequence. For example, J is 4 in FIG. 8.

For example, in Cell0 in FIG. 8, the first offset is 1, the second offset is 2, and the third offset is 3. Further, in Cell1 in FIG. 8, the first offset is 4, the second offset is 5, and the third offset is 6. In addition, in FIG. 8, concatenated sequences #1 to #3 are configured based on the base sequences and the offsets.

As illustrated in FIG. 8, in the second example, usable Preamble sequences (candidates for Preamble sequences) include Preamble sequences having code sequences differing from one another.

Note that a Mod operation may be used for the configuration of offsets and the operation in offset addition. For example, in the example of FIG. 8, the sequence numbers not exceeding the number of usable ZC sequences are calculated by using a Mod 64 operation according to the number of 64 of usable Preamble sequences (usable ZC sequences).

By configuring the Preamble sequence based on the offsets described above, it is possible to prevent the ZC sequences included in one Preamble sequence from overlapping with the ZC sequences of another Preamble sequence even when the one Preamble sequence is shifted in the time domain. Therefore, for example, even in the NTN environment (e.g., a satellite communication environment) where the delay difference between terminals is relatively large, it is possible to reduce a part (overlapping part) of a Preamble sequence included in a delayed Preamble signal which comes to be the same as a Preamble sequence of a Preamble signal of another terminal. It is thus possible to reduce interference between terminals within a cell and interference between cells.

Further, the offsets in the second example may correspond to an example of the hopping pattern indicated by the hopping information. For example, the hopping pattern may be a pattern that serially defines the first offset, the second offset, and the third offset. For example, the hopping pattern in Cell0 in FIG. 8 may be understood as {1, 2, 3} and the hopping pattern in Cell1 in FIG. 8 as {4, 5, 6}. Further, the hopping information may indicate one offset or a hopping pattern including a plurality of offsets. Further, in the second example, the offsets are configured by the identification number of the cell and the order of the offsets. Thus, for example, when terminal 100 has information indicating the identification number of the cell and information indicating the order of the offsets (e.g., information indicating the number of concatenated Preamble sequences, the format of the Preamble sequence, and the like), terminal 100 may calculate the offsets from the identification number of the cell and the order of the offsets. In this case, terminal 100 may not be notified of the hopping information.

Third Example of Preamble Sequence

In the first example and the second example, a configuration method for configuring the Preamble sequence from the base sequence is the same for each of the Preamble sequences usable in one cell. The present disclosure is not limited thereto. In the third example, an example will be described in which the configuration method for configuring the Preamble sequence from the base sequence is different between Preamble sequences usable in one cell.

Figure 9:
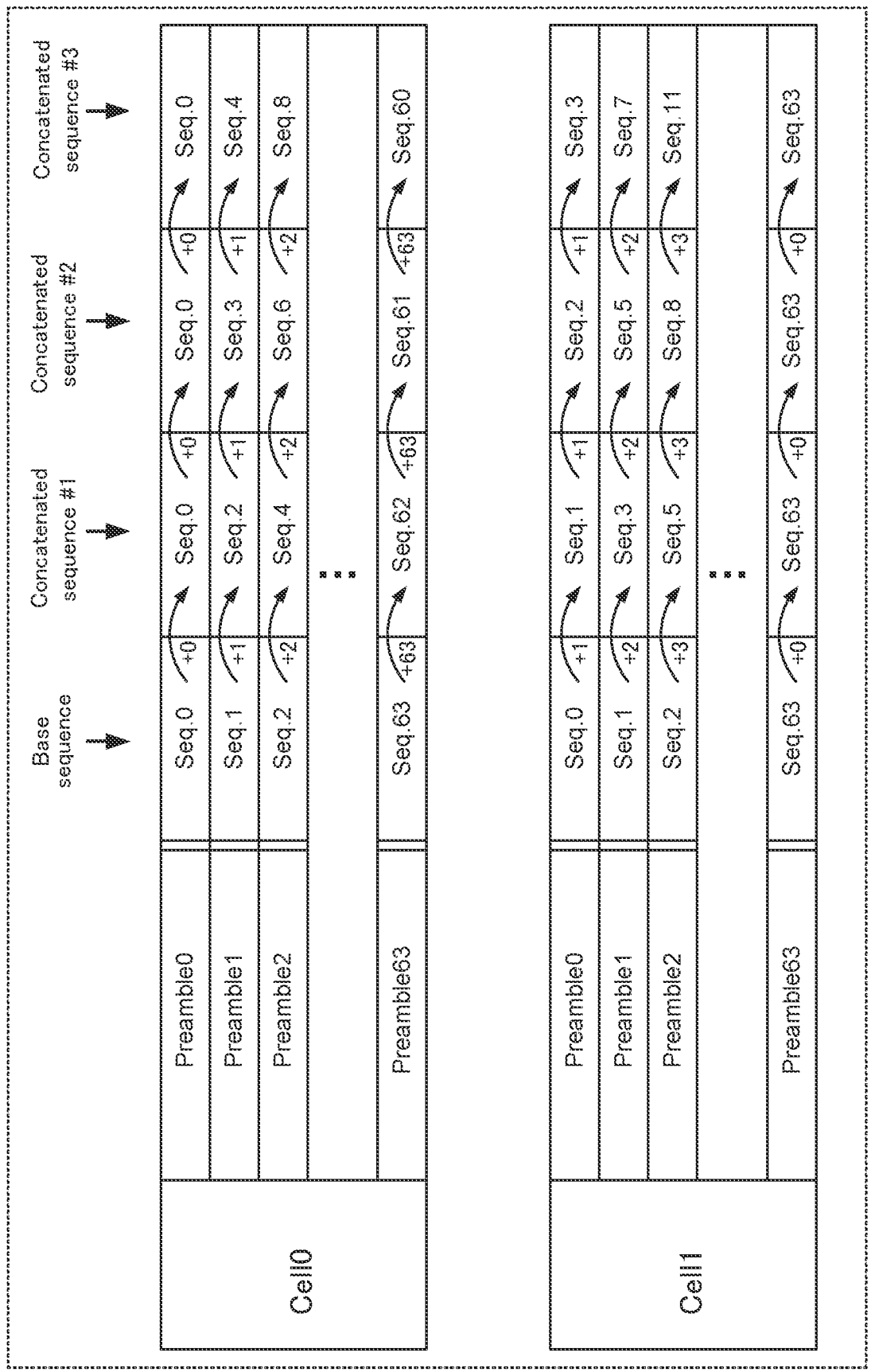
FIG. 9 illustrates a third example of the Preamble sequences in an embodiment.

FIG. 9 illustrates the third example of Preamble sequences in the present embodiment. FIG. 9 like FIGS. 6 and 8 illustrates Preamble sequences usable in each of two cells (Cell0 and Cell1).

In the example of FIG. 9, a set of base sequences common between cells is configured. In addition, the offsets for configuring Preamble sequences (e.g., concatenated sequence #1 to concatenated sequence #3) from the base sequence are different between the Preamble sequences.

The offsets in the third example may be configured based on the identification number of the cell and the Preamble number. For example, when the identification number of the cell is k, offset $N_2$ used to configure a Preamble sequence having Preamble number m may be configured as $N_2$=k+m.

For example, in Cell0 in FIG. 9, the offset used for configuring the Preamble sequence (Preamble0) having the Preamble number of 0 is 0, and the offset used for configuring the Preamble sequence (Preamble1) having the Preamble number of 1 is 1. Further, for example, in Cell1 in FIG. 9, the offset used for configuring the Preamble sequence (Preamble0) having the Preamble number of 0 is 1, and the offset used for configuring the Preamble sequence (Preamble1) having the Preamble number of 1 is 2. In addition, in FIG. 9, concatenated sequences #1 to #3 are configured based on the base sequence and each of the offsets.

As illustrated in FIG. 9, in the third example, usable Preamble sequences (candidates for Preamble sequences) include Preamble sequences having code sequences differing from one another.

Note that a Mod operation may be used for the configuration of offsets and the operation in offset addition. For example, in the example of FIG. 9, the sequence numbers not exceeding the number of usable ZC sequences are calculated by using a Mod 64 operation according to the number of 64 of usable Preamble sequences (usable ZC sequences).

By configuring the Preamble sequence based on the offsets described above, it is possible to prevent the ZC sequences included in one Preamble sequence from overlapping with the ZC sequences of another Preamble sequence even when the one Preamble sequence is shifted in the time domain. Therefore, for example, even in an NTN environment (e.g., a satellite communication environment) where the delay difference between terminals is relatively large, it is possible to reduce a part (overlapping part) of a Preamble sequence included in a delayed Preamble signal which comes to be the same as a Preamble sequence of a Preamble signal of another terminal. It is thus possible to reduce interference between terminals within a cell and interference between cells.

Further, the offsets in the third example may correspond to an example of the hopping pattern indicated by the hopping information. For example, the hopping pattern may be a pattern that serially defines the first offset, the second offset, and the third offset. For example, the hopping pattern for Preamble0 in Cell0 in FIG. 9 may be understood as {0, 0, 0}. Further, for example, the hopping pattern for Preamble0 in Cell1 in FIG. 9 may be understood as {1, 1, 1}. Further, the hopping information may indicate one offset for each Preamble number or a hopping pattern including a plurality of offsets. Further, in the third example, the offsets are configured by the identification number of the cell and the Preamble number. Further, terminal 100 configures one Preamble number from the Preamble number group. Therefore, for example, when terminal 100 has information indicating the identification number of the cell, terminal 100 may calculate an offset from the identification number of the cell and the Preamble number. In this case, terminal 100 may not be notified of the hopping information.

Fourth Example of Preamble Sequences

Figure 10:
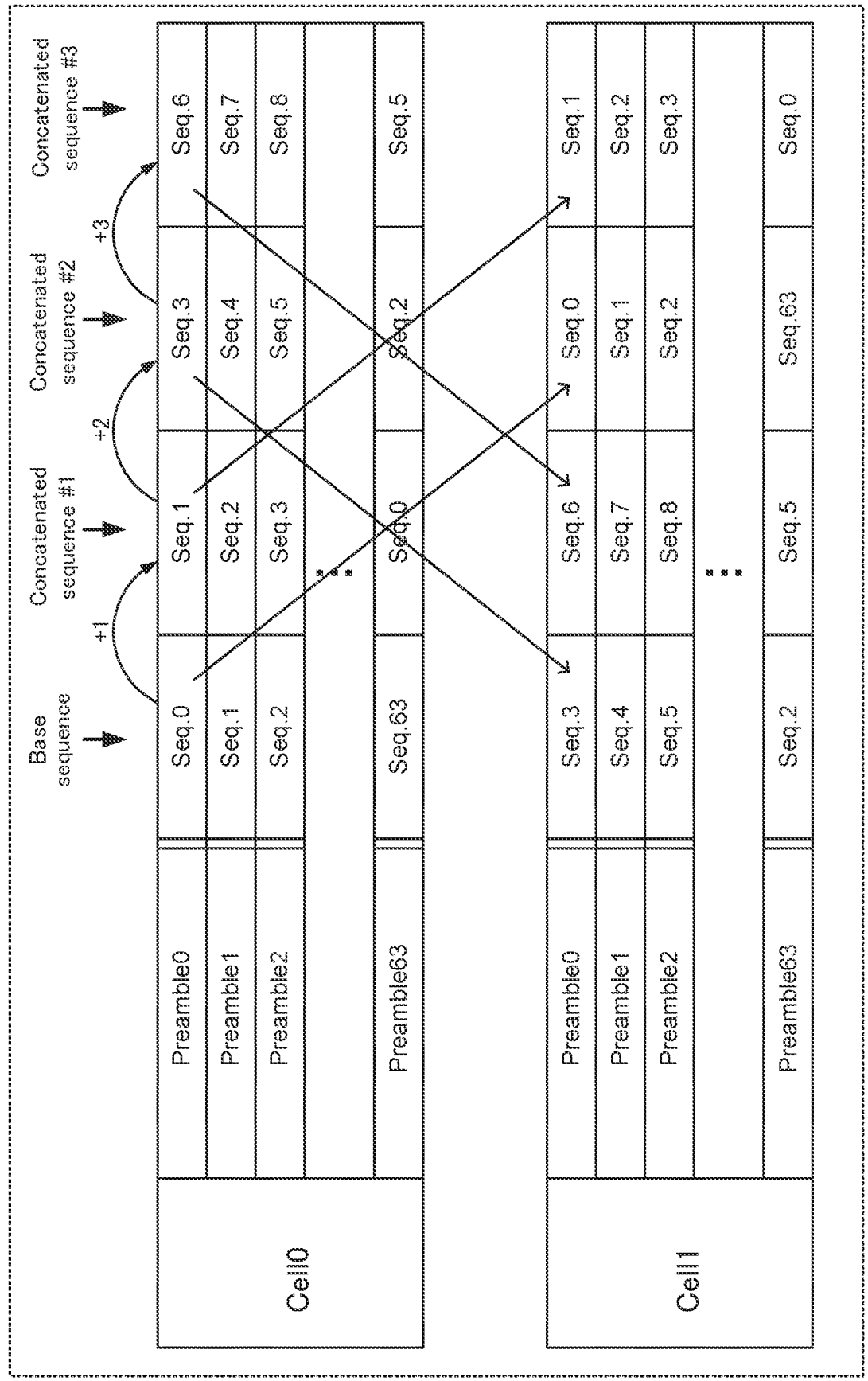
FIG. 10 illustrates a fourth example of the Preamble sequences in an embodiment.

FIG. 10 illustrates the fourth example of Preamble sequences in the present embodiment. FIG. 10 like FIGS. 6, 8, and 9 illustrates Preamble sequences usable in each of two cells (Cell0 and Cell1).

Note that, Preamble sequences usable in Cell0 in FIG. 10 correspond to the Preamble sequences usable in Cell0 illustrated in FIG. 8.

Preamble sequences usable in Cell1 in FIG. 10 correspond to sequences resulting from cyclic shifting of the Preamble sequences usable in Cell0 by two ZC sequences.

As illustrated in FIG. 10, in the fourth example, usable Preamble sequences (candidates for Preamble sequences) include Preamble sequences having code sequences differing from one another.

For example, Preamble0 in Cell1 in FIG. 10 corresponds to a sequence resulting from cyclic shifting of Preamble0 in Cell0 by two ZC sequences. Like Preamble0, Preamble0 to Preamble63 are also cyclically shifted.

With the above configuration of the Preamble sequences, the Preamble sequences of the first cell (e.g., Cell1 in FIG. 10) are configured by cyclic shifting of the Preamble sequences of the second cell (e.g., Cell0 in FIG. 10). Thus, the reuse factor of the ZC sequences can be increased. Moreover, when a delay difference between terminals of different cells is less than a predetermined difference (e.g., the delay difference corresponding to two ZC sequences), the interference between the cells can be reduced.

Here, when the Preamble sequences of the first cell are configured based on the Preamble sequences of the second cell, the second cell may be referred to as a "reference cell" for the first cell. In this case, the hopping information in the fourth example may include hopping information of the reference cell and information indicating a cyclic shift amount with respect to the Preamble sequences of the reference cell. In other words, in the case of FIG. 10, in Cell1, the information (first information) on the configuration of the Preamble sequences usable in Cell0 and the information (second information) indicating the cyclic shift amount for configuring the Preamble sequences usable in Cell1 from the Preamble sequences usable in Cell0 may be included in the hopping information, for example. In this case, PRACH generator 101 of terminal 100 in Cell1 generates one Preamble sequence from among the Preamble sequences usable in Cell0 based on the first information. Then, terminal 100 in Cell1 cyclically shifts the generated Preamble sequence based on the second information to generate a Preamble sequence to be used in Cell1.

Note that, in the example of FIG. 10, the example of cyclic shifting by two ZC sequences (the example in which the cyclic shift amount corresponds to two ZC sequences) is illustrated, but the present disclosure is not limited thereto. The amount of cyclic shifting may be an amount corresponding to one ZC sequence, or an amount corresponding to three or more ZC sequences. For example, in the case where the amount of cyclic shifting is the amount corresponding to one ZC sequence, interference between cells can be reduced when a delay difference between the cells is less than a delay difference corresponding to one ZC sequence.

In addition, the example of FIG. 10 is illustrated in which the Preamble sequences usable in Cell0 correspond to the Preamble sequences usable in Cell0 illustrated in FIG. 8, but the present disclosure is not limited thereto. The configuration method of configuring the Preamble sequences usable in the reference cell may be the configuration method described in another example (e.g., the first example or the third example) described above.

In the present embodiment described above, the Preamble sequence used by terminal 100 for PRACH transmission is configured from among the usable Preamble sequences (candidates for Preamble sequences). In addition, in the present embodiment, Preamble sequences having two or more code sequences different from one another are included in the candidates for Preamble sequences. With such a configuration, even in an NTN environment where a propagation delay of propagation between terminals and a base station greatly differ between the terminals, an appropriate random access procedure depending on the propagation delay between a terminal and the base station can be achieved by flexibly configuring the configuration of a Preamble sequence.

This configuration makes it possible for the base station receiving a Preamble signal to identify a Preamble sequence within a cell or across cells. This configuration also makes it possible to increase the reuse factor of the sequence numbers of the ZC sequences. In addition, a Preamble signal including a Preamble sequence in which a plurality of ZC sequences are concatenated can be combined and received by the base station. Thus, for example, long-range radio communication in an NTN environment (e.g., a satellite communication environment) is possible.

Note that the first to fourth examples of the above-described embodiment may be used in combination or may be dynamically switched. For example, base station 200 may select, for terminal 100, one of the configuration methods (generation methods) of configuring the Preamble sequence as illustrated in the first to fourth examples. In this case, terminal 100 may be notified of information indicating the selected configuration method. For example, the information indicating the selected configuration method may be included in the hopping information or may be notified using other signaling (e.g., higher layer signaling, DCI, or the like).

In addition, in the above-described embodiment, the cell may be an area defined by the reception power of a Synchronization Signal/PBCH Block (SSB) and/or a Channel State Information-Reference Signal (CSI-RS) transmitted by the base station (satellite), or may be an area defined by the geographical position.

In the RRC signaling, the configuration of PRACH resources transmitted by the base station may be notified by a parameter set such as RACH-ConfigCommon, RACH-ConfigDedicated, and RACH-ConfigGeneric. For example, the sequence hopping information in the embodiment described above may be notified in the RRC signaling described above. Further, the sequence hopping information in the above-described embodiment may be notified in the system information or may be notified in terminal-specific information.

Note that, the above-described embodiment has been described in relation to the example in which the Preamble sequences are generated by concatenation of the four ZC sequences, but the present disclosure is not limited thereto. The number of concatenated ZC sequences in the Preamble sequence may be 3 or less, or may be 5 or more. Further, the number of concatenated ZC sequences in the Preamble sequence may be variable for each cell. For example, the number of concatenated ZC sequences in a Preamble sequence may be relatively smaller in a cell located near the satellite (base station), and the number of concatenated ZC sequences in a Preamble sequence may be relatively larger in a cell located far from the satellite. By changing the number of concatenated sequences for each cell, it is possible to configure necessary and sufficient PRACH resources. Further, it is possible to identify Preamble signals of PRACHs between cells by the numbers of concatenated sequences changed for each cell.

In addition, the above-described embodiment has been described in relation to the example in which the ZC sequences are used for the Preamble sequences, but the present disclosure is not limited thereto. For example, other code sequences different from the ZC sequence may be used for the Preamble sequences. For example, a frequency hopping sequence, such as that used for Narrowband Internet of Things (NB-IoT), may be used for the Preamble sequences.

In addition, the above-described embodiment has been described in relation to the example in which the number of Preamble sequences usable per cell is 64, but the present disclosure is not limited thereto. The number of Preamble sequences usable per cell may be a number different from 64.

In addition, the above-described embodiment has been described in relation to the example of the Preamble sequences in two cells, but the present disclosure may be applied to configuration of Preamble sequences in each of three or more cells.

In addition, the embodiment described above has been described in relation to the example in which the usable Preamble sequences, in other words, candidates for Preamble sequences, are generated by concatenation of ZC sequences, but the present disclosure is not limited thereto. The Preamble sequences generated by concatenation of ZC sequences and the Preamble sequences generated by repeating one ZC sequence may be used in combination. For example, the use of the Preamble sequences generated by concatenation of ZC sequences and the use of the Preamble sequences generated by repeating one ZC sequence may be configured on a basis of RACH Occasion.

Figure 11:
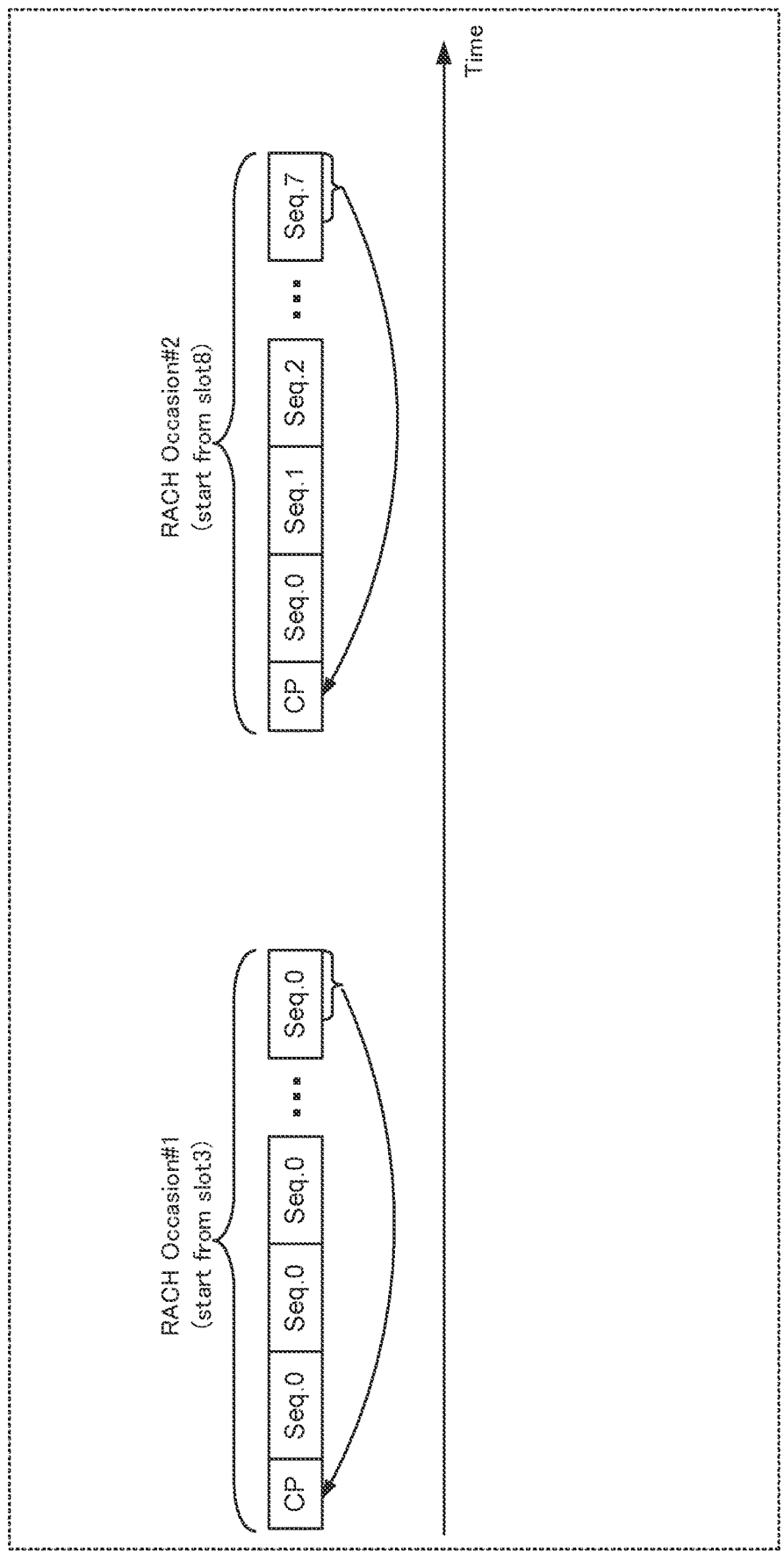
FIG. 11 illustrates an example of combined use of the Preamble sequences.

FIG. 11 illustrates an example of the combined use of Preamble sequences. The horizontal axis in FIG. 11 indicates the time axis. FIG. 11 illustrates the example of Preamble signals of a PRACH transmitted at two RACH Occasions (RACH Occasion #1 and RACH Occasion #2) provided in the time domain.

In FIG. 11, the Preamble signal transmitted at RACH Occasion #1 starting from slot 3 includes a Preamble sequence generated by repeating Seq.0 and a CP obtained by copying the rearmost part of Seq.0. Further, the Preamble signal transmitted at RACH Occasion #2 starting from slot 8 includes a Preamble sequence generated by concatenation of a plurality of ZC sequences including Seq.0, Seq.1, Seq.2, and Seq.7, and a CP obtained by copying the rearmost part of Seq.7.

As illustrated in FIG. 11, the Preamble sequence generated by concatenation of ZC sequences and the Preamble sequence generated by repeating one ZC sequence are used in combination, whereby, for example, longer range communication can be supported.

Note that the concatenation of ZC sequences in the present embodiment is not limited to the concatenation of ZC sequences having mutually different sequence numbers, but may also include concatenation of ZC sequences having the same sequence number. In other words, the Preamble sequence generated by concatenation of ZC sequences in the present embodiment may include the Preamble sequence generated by repeating one ZC sequence.

Note that, for example, although FIG. 11 illustrates the example in which the CPs obtained by copying the rearmost parts of the Preamble sequences having a plurality of ZC sequences are attached to the fronts of the Preamble sequences, the present disclosure is not limited thereto. For example, a CP may be attached to each of a plurality of ZC sequences included in each of the Preamble sequences.

Figure 12:
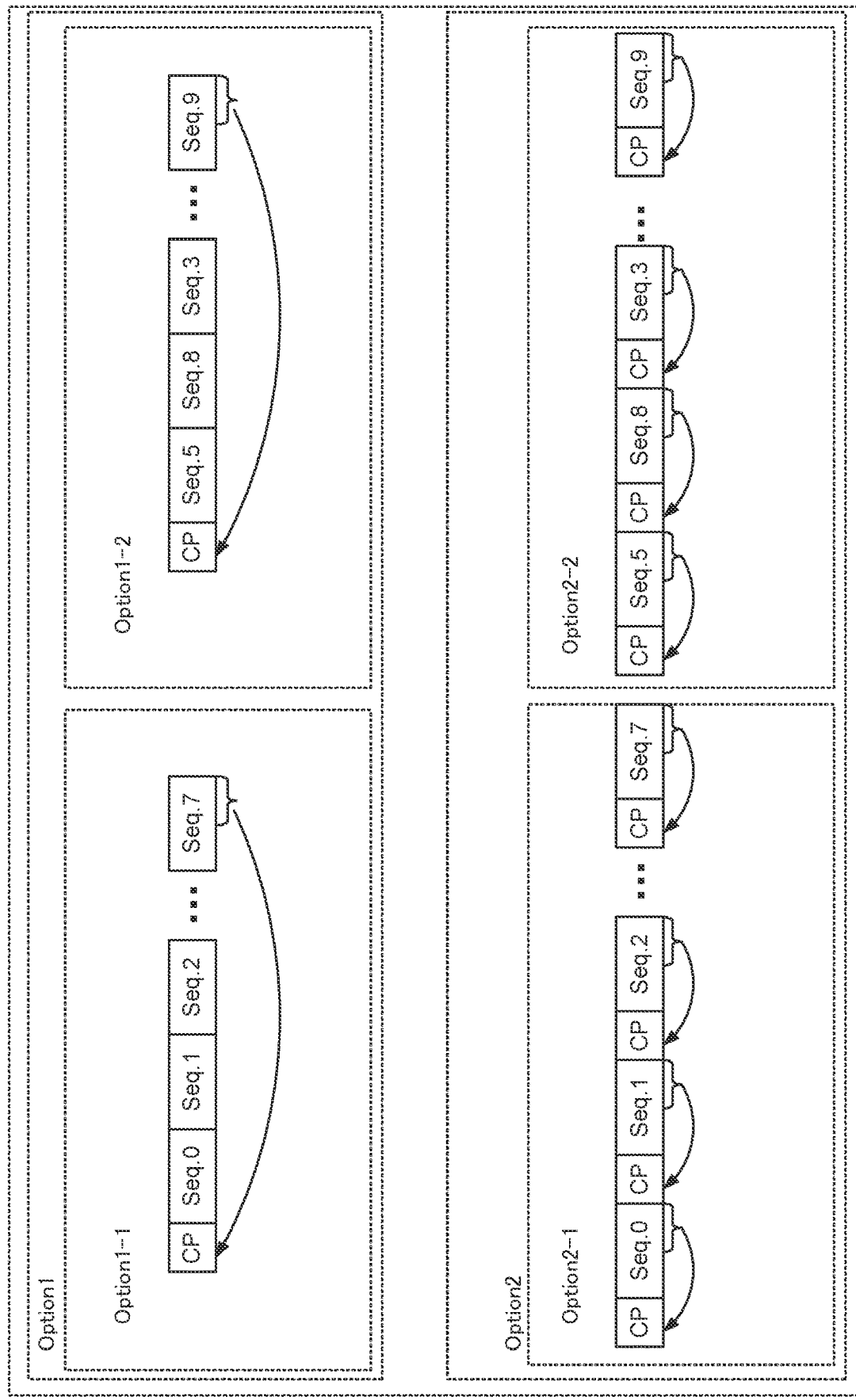
FIG. 12 illustrates examples of CPs attached to the Preamble sequences.

FIG. 12 illustrates examples of CPs attached to Preamble sequences. FIG. 12 illustrates two options (Option 1 and Option 2) for the CPs attached to the Preamble sequences.

In Option 1 in FIG. 12, a CP copying a part of the last one of the ZC sequences included in the Preamble sequence is attached to the front of each of the Preamble sequences. For example, in the example of Option 1-1, the CP copying a part of Seq.7 at the last is attached to the front of the Preamble sequence, and in the example of Option 1-2, the CP copying a part of Seq.9 at the last is attached to the front of the Preamble sequence.

In Option 2 in FIG. 12, a CP is attached to each ZC sequence included in Preamble sequences. For example, in the example of Option 2-1, the CP copying a rearmost part of Seq.0 included in the Preamble sequence is attached to the front of Seq.0. Also in the other ZC sequences (e.g., ZC sequences of Seq.1, Seq.2, Seq.7, and those between Seq.2 and Seq.7), as in Seq.0, a CP copying a rearmost part of each of the ZC sequences is attached to the front of the corresponding ZC sequence. Also in Option 2-2 example as in Option 2-1, a CP copying of the rearmost part of each ZC sequence is attached to the front of the corresponding ZC sequence.

Note that in Option 2, the CPs attached to the ZC sequences other than the front ZC sequence may be considered to be inserted between the ZC sequences.

When a plurality of ZC sequences are transmitted, the ZC sequences may be transmitted consecutively or intermittently.

Note that, in the embodiment described above, the NTN environment (e.g., a satellite communication environment) is taken as an example, but the present disclosure is not limited thereto. The present disclosure may be applied to other communication environments (e.g., a terrestrial cellular environment in LTE and/or NR)

Further, for example, CS multiplexing and/or multiplexing using a Walsh-Hadamard sequence may be applied to the Preamble sequences in the above-described embodiment.

The expression "section" used in the above-described embodiments may be replaced with another expression such as "circuit (circuitry)," "device," "unit," or "module."

In addition, the term "concatenate" in the above-described embodiment may be replaced with other terms such as "combine," "arrange (serially)." and "place (serially)."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A transmission apparatus according to an exemplary embodiment of the present disclosure includes: transmission circuitry, which, in operation, transmits a signal of a random access channel; and control circuitry, which, in operation, configures a preamble sequence from among a plurality of preamble sequence candidates, the preamble sequence being used for the signal, in which at least one of the plurality of preamble sequence candidates is composed of two or more code sequences different from each other.

In the transmission apparatus according to an exemplary embodiment of the present disclosure, the control circuitry configures the preamble sequence based on a sequence number indicating a first code sequence and a hopping pattern for the sequence number.

In the transmission apparatus according to an exemplary embodiment of the present disclosure, the plurality of preamble sequence candidates include a preamble sequence in which a first code sequence and a second code sequence obtained from the first code sequence by a predetermined method are concatenated together, a set of a plurality of the first code sequences assigned for a plurality of cells is common between the plurality of cells, and the predetermined method differs between the plurality of cells.

In the transmission apparatus according to an exemplary embodiment of the present disclosure, the second code sequence has a sequence number dependent on a sequence number of the first code sequence, an identifier of each of the plurality of cells, and a position of the second code sequence counted from the first code sequence in the preamble sequence included in the plurality of preamble sequence candidates.

In the transmission apparatus according to an exemplary embodiment of the present disclosure, the preamble sequence included in the plurality of preamble sequence candidates includes the first code sequence and a plurality of the second code sequences concatenated serially with the first code sequence and being M in number, where M denotes an integer equal to or greater than 1, one of the M second code sequences which is concatenated in an mth place has a sequence number obtained by adding m×N to the sequence number of the first code sequence, where m denotes an integer of from 1 through M and N denotes an integer equal to or greater than 1, and N differs between the plurality of cells.

In the transmission apparatus according to an exemplary embodiment of the present disclosure. N has a value dependent on the identifier of the cell and the sequence number of the first code sequence.

In the transmission apparatus according to an exemplary embodiment of the present disclosure, the preamble sequence included in the plurality of preamble sequence candidates includes the first code sequence and a plurality of the second code sequences concatenated serially with the first code sequence and being M in number, where M denotes an integer equal to or greater than 1, one of the M second code sequences which is concatenated first has a sequence number obtained by adding N to the sequence number of the first code sequence, one of the M second code sequences which is concatenated in an mth place has a sequence number obtained by adding N to a sequence number of one of the M second code sequences which is concatenated in an m−1th place, where m denotes an integer of from 2 through M, and N has a value dependent on the identifier of the cell and a concatenation order of the M second code sequences.

In the transmission apparatus according to an exemplary embodiment of the present disclosure, a second preamble sequence obtained by shifting a first preamble sequence included in the plurality of preamble sequence candidates on a basis of a code sequence does not cause an overlap with each of the plurality of preamble sequence candidates on a basis of the code sequence.

In the transmission apparatus according to an exemplary embodiment of the present disclosure, a first preamble sequence included in the plurality of preamble sequence candidates for a first cell is a preamble sequence resulting from cyclic shifting of a second preamble sequence included in the plurality of preamble sequence candidates for a second cell, the cyclic shifting being performed on a basis of a code sequence.

A reception apparatus according to an embodiment of the present disclosure includes: reception circuitry, which, in operation, receives a signal of a random access channel; and control circuitry, which, in operation, determines a preamble sequence from among a plurality of preamble sequence candidates, the preamble sequence being included in the signal, in which at least one of the plurality of preamble sequence candidates is composed of two or more code sequences different from each other.

A transmission method according to an exemplary embodiment of the present disclosure includes: configuring, from among a plurality of preamble sequence candidates, a preamble sequence used for a signal of a random access channel; and transmitting the signal of the random access channel, in which at least one of the plurality of preamble sequence candidates is composed of two or more code sequences different from each other.

A reception method according to an exemplary embodiment of the present disclosure includes: receiving a signal of a random access channel; and determining, from among a plurality of preamble sequence candidates, a preamble sequence included in the signal, in which at least one of the plurality of preamble sequence candidates is composed of two or more code sequences different from each other.

The disclosure of Japanese Patent Application No. 2019-064605 dated Mar. 28, 2019 including the specification, drawings and abstract is incorporated herein by reference in its entirety.

INDUSTRIAL APPLICABILITY

An exemplary embodiment of the present disclosure is useful for radio communication systems.

REFERENCE SIGNS LIST

100 Terminal
101 PRACH generator
102, 206 Data generator
103, 208 Radio transmitter
104, 201 Antenna
105, 202 Radio receiver
106 Demodulator/decoder
200 Base station
203 Data reception processor
204 PRACH detector
205 PRACH Resource configurator
207 Data transmission processor

The invention claimed is:

1. A transmission apparatus, comprising:
   transmission circuitry, which, in operation, transmits a signal of a random access channel; and
   control circuitry, which, in operation, configures a preamble sequence from among a plurality of preamble sequence candidates, the preamble sequence used for the signal, wherein
the preamble sequence with a cyclic prefix transmitted on a first random access channel (RACH) occasion and the preamble sequence with a cyclic prefix transmitted on a second RACH occasion are discontinuous in a time domain such that the cyclic prefix transmitted on the second RACH occasion is spaced from the preamble sequence transmitted on the first RACH occasion in the time domain, and a total number of Zadoff-Chu (ZC) sequences included in the preamble sequence differs from a total number of ZC sequences included in a preamble sequence of another cell.

2. The transmission apparatus according to claim 1, wherein the preamble sequence is generated by repeating a code sequence.

3. The transmission apparatus according to claim 1, wherein at least one of the plurality of preamble sequence candidates is composed of two or more code sequences different from each other.

4. The transmission apparatus according to claim 3, wherein
the control circuitry configures the preamble sequence based on a sequence number indicating a first code sequence and a hopping pattern for the sequence number.

5. The transmission apparatus according to claim 3, wherein
the plurality of preamble sequence candidates include a preamble sequence in which a first code sequence and a second code sequence obtained from the first code sequence by a predetermined method are concatenated together,
a plurality of the first code sequences assigned for a plurality of cells is common between the plurality of cells, and
the predetermined method differs between the plurality of cells.

6. The transmission apparatus according to claim 5, wherein
the second code sequence has a sequence number, which is dependent on a sequence number of the first code sequence, on an identifier of the cell, and on a position of the second code sequence counted from the first code sequence in the preamble sequence included in the plurality of preamble sequence candidates.

7. The transmission apparatus according to claim 6, wherein
the preamble sequence included in the plurality of preamble sequence candidates includes the first code sequence and M number of a plurality of the second code sequences concatenated serially with the first code sequence, where M denotes an integer equal to or greater than 1,
one of the M second code sequences which is concatenated in an mth place has a sequence number obtained by adding m×N to the sequence number of the first code sequence, where m denotes an integer of from 1 through M, and N denotes an integer equal to or greater than 1, and
N differs between the plurality of cells.

8. The transmission apparatus according to claim 7, wherein
N has a value dependent on the identifier of the cell and the sequence number of the first code sequence.

9. The transmission apparatus according to claim 6, wherein
the preamble sequence included in the plurality of preamble sequence candidates includes the first code sequence and M number of a plurality of the second code sequences concatenated serially with the first code sequence, where M denotes an integer equal to or greater than 1,
one of the M second code sequences which is concatenated first has a sequence number obtained by adding N to the sequence number of the first code sequence,
one of the M second code sequences which is concatenated in an mth place has a sequence number obtained by adding N to a sequence number of one of the M second code sequences which is concatenated in an m−1th place, where m denotes an integer of from 2 through M, and
N has a value dependent on the identifier of the cell and a concatenation order of the M second code sequences.

10. The transmission apparatus according to claim 3, wherein
a second preamble sequence obtained by shifting a first preamble sequence included in the plurality of preamble sequence candidates on a basis of a code sequence does not cause an overlap with each of the plurality of preamble sequence candidates on a basis of the code sequence.

11. The transmission apparatus according to claim 3, wherein
a first preamble sequence included in the plurality of preamble sequence candidates for a first cell is a preamble sequence resulting from cyclic shifting of a second preamble sequence included in the plurality of preamble sequence candidates for a second cell, the cyclic shifting being performed on a basis of a code sequence.

12. The transmission apparatus according to claim 1, wherein a first ZC sequence after the cyclic prefix transmitted on the second RACH occasion is same as a first ZC sequence after the cyclic prefix transmitted on the first RACH occasion.

13. A reception apparatus, comprising:
reception circuitry, which, in operation, receives a signal of a random access channel; and
control circuitry, which, in operation, determines, from among a plurality of preamble sequence candidates, a preamble sequence included in the signal,
wherein
the preamble sequence with a cyclic prefix received on a first random access channel (RACH) occasion and the preamble sequence with a cyclic prefix received on a second RACH occasion are discontinuous in a time domain such that the cyclic prefix transmitted on the second RACH occasion is spaced from the preamble sequence transmitted on the first RACH occasion in the time domain, and
a total number of Zadoff-Chu (ZC) sequences included in the preamble sequence differs from a total number of ZC sequences included in a preamble sequence of another cell.

14. The reception apparatus according to claim 13, wherein a first ZC sequence after the cyclic prefix transmitted on the second RACH occasion is same as a first ZC sequence after the cyclic prefix transmitted on the first RACH occasion.

15. A transmission method, comprising:
configuring, from among a plurality of preamble sequence candidates, a preamble sequence used for a signal of a random access channel; and
transmitting the signal of the random access channel, wherein
the preamble sequence with a cyclic prefix transmitted on a first random access channel (RACH) occasion and the preamble sequence with a cyclic prefix transmitted on a second RACH occasion are discontinuous in a time domain such that the cyclic prefix transmitted on the second RACH occasion is spaced from the preamble sequence transmitted on the first RACH occasion in the time domain, and
a total number of Zadoff-Chu (ZC) sequences included in the preamble sequence differs from a total number of ZC sequences included in a preamble sequence of another cell.

16. The transmission method according to claim 15, wherein a first ZC sequence after the cyclic prefix transmitted on the second RACH occasion is same as a first ZC sequence after the cyclic prefix transmitted on the first RACH occasion.

17. A reception method, comprising:
receiving a signal of a random access channel; and
determining, from among a plurality of preamble sequence candidates, a preamble sequence included in the signal,
wherein
the preamble sequence with a cyclic prefix received on a first random access channel (RACH) occasion and the preamble sequence with a cyclic prefix receive on a second RACH occasion are discontinuous in a time domain such that the cyclic prefix transmitted on the second RACH occasion is spaced from the preamble sequence transmitted on the first RACH occasion in the time domain, and
a total number of Zadoff-Chu (ZC) sequences included in the preamble sequence differs from a total number of ZC sequences included in a preamble sequence of another cell.

18. The reception method according to claim 17, wherein a first ZC sequence after the cyclic prefix transmitted on the second RACH occasion is same as a first ZC sequence after the cyclic prefix transmitted on the first RACH occasion.

* * * * *